May 8, 1923.
C. A. J. ANDERSEN
BEET TOPPER
Filed Feb. 14, 1922         2 Sheets-Sheet 1
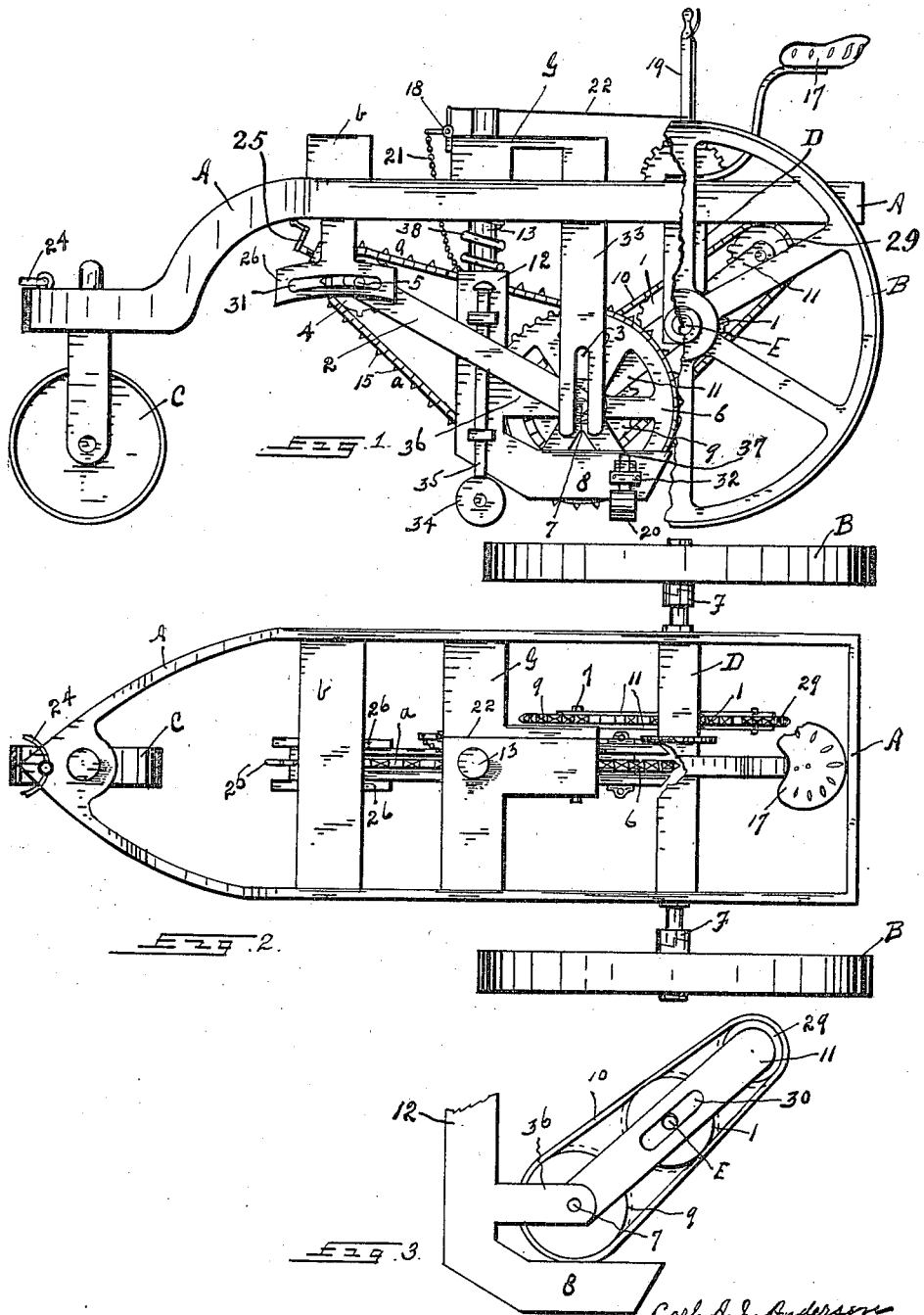
Carl A. J. Andersen
INVENTOR
BY J. M. Thomas
ATTORNEY

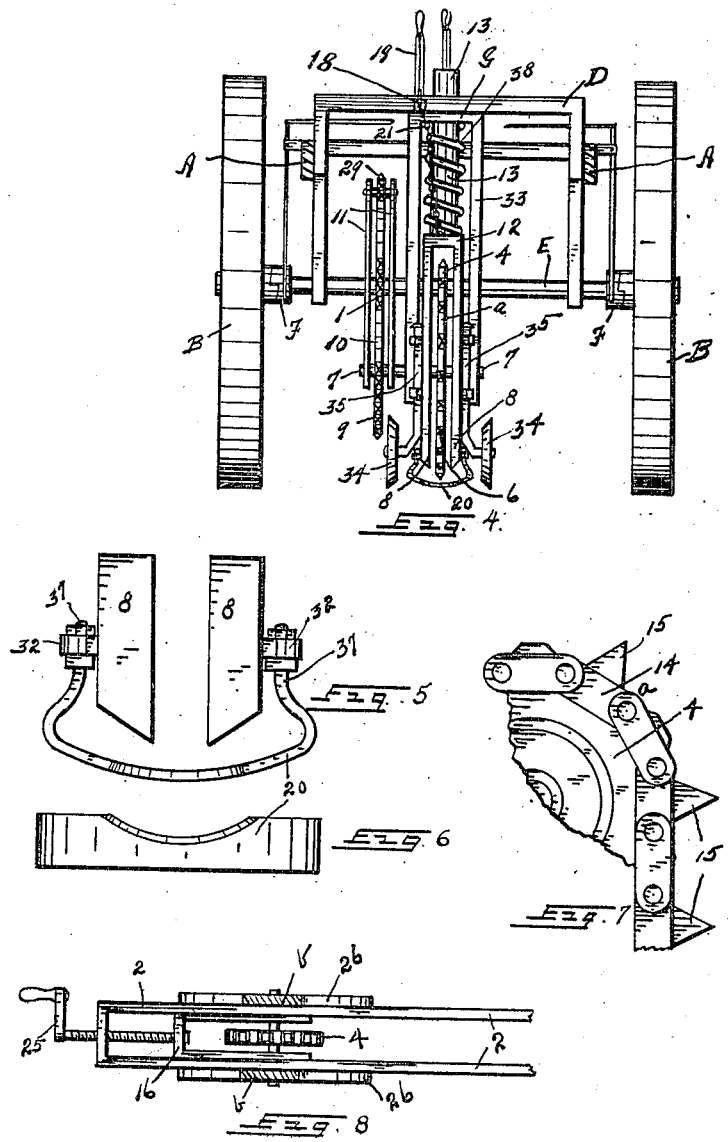

Patented May 8, 1923.

1,454,501

UNITED STATES PATENT OFFICE.

CARL A. J. ANDERSEN, OF SALT LAKE CITY, UTAH.

BEET TOPPER.

Application filed February 14, 1922. Serial No. 536,400.

*To all whom it may concern:*

Be it known that I, CARL A. J. ANDERSEN, a citizen of Norway, residing at Salt Lake City, in the county of Salt Lake and State of Utah, have invented certain new and useful Improvements in Beet Toppers, of which the following is a specification.

My invention relates to beet toppers, and has for its object to provide a beet topper which will top beets in the ground before they are dug and automatically adjust itself in order that the desired amount of the body of the individual beet will be cut off with the foliage.

These objects I accomplish with the machine illustrated in the accompanying drawings in which similar letters and numerals of reference indicate like parts throughout the several views, and as described in the specification forming a part of this application and pointed out in the appended claims.

In the drawings in which I have shown a substantial embodiment of my invention, Figure 1 is a side elevation of the machine, parts cut away. Figure 2 is a plan view of the machine, parts cut away and parts omitted which would obscure. Figure 3 is a diagrammatic view of a portion of the shoe and driving mechanism connected with the main axle of the machine. Figure 4 is a front elevation of the machine, parts omitted. Figure 5 is a front view of the cutting knife and end of the shoe. Figure 6 is a view showing the bottom of the cutting knife. Figure 7 is a fragment in side elevation of the sprocket wheel and peg chain. Figure 8 is a plan view, somewhat enlarged, of the peg chain adjusting means.

The present invention consists of a main frame A, preferably shaped as shown and made of metal, which frame is carried on the wheels B at the rear and the wheel C in front. The rear of the said frame A is supported by the U-shaped brace D which rests on the axle E of the said wheels B. The braces for maintaining the position of the foot of said U-shaped brace D and axle E relative to said main frame A are omitted. The topping mechanism is secured on said axle E and said axle is operatively connected with said wheels B by the clutches F.

The topping mechanism is driven by the axle E through the sprocket gear 1 which is secured on said axle E and is connected with a counter shaft 7 by the drive chain 10. The said counter shaft 7 is journalled in the slotted braces 2 and 11, and is slidably journalled in the standards 33 of the cross head G. The said counter shaft 7 moves vertically up and down in the recess 3 provided in each of the said standards 33, and is braced from other movements by the bearing in said braces 2 and 11. A sprocket gear 6 is secured on said counter shaft 7 and is connected with the sprocket wheel 4 by the peg chain $a$. The said sprocket wheel 4 is secured on the short shaft 5 which is journalled in the said braces 2 and is slidable in the U-shaped bearing member $b$. The said bearing member $b$ is rigidly fastened on said frame A and has foot members 26 within which is cut the curved slot 31, within which is carried the end of the short shaft 5. A chain adjusting means is shown in Figure 8 which consists of the U-shaped slide 16, the legs of which are held and guided between the said braces 2 and the foot members 26, said slide 16 being moved by the crank screw 25. The power of the axle E is imparted through the said chain 10 as engaged and driven by the sprocket gear 1. The said chain 10 is operated over the sprocket wheel 29, which is journalled in said braces 11, and the sprocket gear 9, and to allow longitudinal movement of the said braces 11, a slot 30 is cut in each of said braces 11, in which the said axle E is operated. The said cross head G with its two depending standards 33 is rigidly secured on the said frame A, and has a depending round staff 13, the lower end of which is flanged to support, in its lowest position, the shoe frame 12, and between the lower side of the said cross head G and the upper side of the shoe frame 12 and on said depending staff 13 is the spring 38 which tends to keep said shoe frame and shoes 8 in contact with the ground. The said shoe frame 12 has two lateral lugs 36 which also act as bearings for the said shaft 7. The lower ends of the said shoe frame 12 are formed into the shoes 8 which slide along on the ground except when a beet growing high out of the ground is encountered by the peg chain a; then said shoes are forced upwardly and carry the topping knife to the desired position to top that particular beet. The topping knife 20 is adjustably fastened on said shoes by the ascending or upwardly projecting and threaded prongs 37 passing through the perforated integral lugs 32 and held by nuts screwed on said prongs 37. The lower edges of the said shoes 8 are tapered to an edge, as shown in Figures 4 and 5. As an additional means of preventing side movement of the shoes 8 the rollers 34 are journalled on and carried by the guide rods 35 which are slidable vertically on the outer sides of said shoe frame 12. The peg chain a has alternate links 14 therein on each of which is an integral outwardly extending peg 15 which engages the body of the beets as the machine is moved over the beets. A seat 17 is provided for the operator and a bell crank lever 18 is connected with a hand lever 19 by the link rod 22, and said bell crank lever 18 is connected by a chain 21 with said shoe frame 12, by means of which the said shoes 8 may be raised when traveling from field to field.

The operation of my machine is as follows: With power applied to draw the machine along and over rows of beets in the ground the traction of the wheels B when the clutches F are engaged, as shown in Figures 2 and 4, will rotate the axle E and drive the chain 10. The said chain 10 running over the sprocket wheel 29 and sprocket gear 9 will drive the counter shaft 7, and impart motion to the sprocket gear 6 and drive the peg chain a. As the machine is moved along one row of beets the shoes 8 will be drawn over the top and foliage on both sides of a row of beets and the knife 20 will cut the foliage from the body of the beets at the vertical position desired for each beet, according to the relative position of the knife 20 as adjusted by the prongs 37 and nuts screwed thereon. Should a beet be engaged which grows high out of the ground the peg chain pegs 15 will stick in the crown of the beet and prevent its being pushed forward by the knife, and at the same time the chain and the sprocket gear 6 will climb up and be drawn over the beet. As the shoes 8, gear 6 and portions of the peg chain a pass over the crown of the beet the knife will be raised by the shoes 8 and will cut the crown off of the beet with the foliage. The said spring 38 will act immediately and move the shoe frame 12 and shoes 8 with the knife down to top the next beet forwardly in the row. The slots 30 and 31 will allow longitudinal movement of the braces 2 and 11 and thereby the upward movement of the lower end of each of said braces. The counter shaft 7 and sprocket wheel 6 will move up and down and the chains a and 10 will be kept in engagement with their respective sprockets. It will be obvious that with slight changes the machine may be constructed to top two rows of beets as well as one. Any power may be used to draw the machine by hitching the team or tractor to the ring 24.

Having described my invention and its operation I desire to secure by Letters Patent and claim:—

1. A beet topper comprising a wheel supported frame; an axle journalled in and connected by clutches with two of said wheels; a sprocket gear on said axle; braces movable on said axle; sprocket wheels having shafts journalled in each end portion of said braces; a chain engaged by the said sprocket gear and operating said sprocket wheels; a sprocket gear on one of said shafts; a cross head on said frame having a depending staff and depending legs with slots therein; a shoe frame in which the last mentioned shaft is journalled; shoes yieldingly held in contact with the ground and integral with said shoe frame; another pair of braces one end of each of which is carried on said last mentioned shaft; a bearing member on said frame having slotted feet; a sprocket wheel with its shaft carried in said last mentioned slots; a peg chain operable over the last mentioned sprocket wheel and the last mentioned sprocket gear; and a topping knife fastened on said shoes and adjustable as to said peg chain.

2. A beet topper comprising a wheel supported frame; a peg chain sprocket gear carried under said frame; a cross head on said frame between the lower portions of which said sprocket gear is vertically movable; a shoe frame in a portion of which said sprocket gear is journalled; a depending staff in said cross head on which said shoe frame is carried; shoes integral with said shoe frame between which said sprocket gear is operated; a sprocket wheel carried by a bearing member on said frame; a peg chain carried over said sprocket gear and sprocket wheel; and a topping knife adjustably fastened on said shoes.

3. A beet topper comprising a wheel supported frame; a sprocket gear and shaft therein; means connected with the wheels of said frame for rotating said sprocket gear and shaft; bearings for said shaft which allow free vertical movement of said sprocket gear; shoes yieldingly held in contact with the ground and operable on the sides of said sprocket gear; and a topping knife fastened on said shoes.

4. In a beet topper the combination with a driven axle; a sprocket gear thereon; a sprocket chain driven by said gear; a shaft parallel with said axle and journalled for rotation with free vertical movement; a sprocket gear on said shaft over which said sprocket chain is operated; another sprocket gear on said shaft and rotatable therewith; a cross head having a depending staff; a shoe frame yieldingly held at the lower end of said staff and in which the shaft of the last mentioned sprocket gear is journalled; shoes integral with said shoe frame and between which the last mentioned sprocket gear is operable; and a knife adjustable as to said shoes and secured thereon.

In testimony whereof I have affixed my signature.

CARL A. J. ANDERSEN.